(12) United States Patent
Gul et al.

(10) Patent No.: US 11,866,665 B2
(45) Date of Patent: Jan. 9, 2024

(54) ANTI-FOULING COMPOSITIONS FOR USE IN CRUDE OIL PRODUCTION AND PROCESSING

(71) Applicant: Ecolab USA Inc., St. Paul, MN (US)

(72) Inventors: Omer Gul, Rosenberg, TX (US); Abuzar Syed, Richmond, TX (US); Larnesia Caulfield, Houston, TX (US); Juan M. Garcia, III, Sugar Land, TX (US); Janelle Leigh Pennington, Missouri City, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 17/646,190

(22) Filed: Dec. 28, 2021

(65) Prior Publication Data

US 2022/0204878 A1 Jun. 30, 2022

Related U.S. Application Data

(60) Provisional application No. 63/131,272, filed on Dec. 28, 2020.

(51) Int. Cl.
| | |
|---|---|
| *C10G 75/04* | (2006.01) |
| *C09D 7/65* | (2018.01) |
| *C09D 7/63* | (2018.01) |
| *C09D 161/06* | (2006.01) |

(52) U.S. Cl.
CPC .............. *C10G 75/04* (2013.01); *C09D 7/63* (2018.01); *C09D 7/65* (2018.01); *C09D 161/06* (2013.01)

(58) Field of Classification Search
CPC . C10G 75/04; C09D 7/63; C09D 7/65; C09D 161/06
See application file for complete search history.

(56) References Cited

U.S. PATENT DOCUMENTS

| | | | | |
|---|---|---|---|---|
| 3,772,182 | A * | 11/1973 | Hubbard | C10L 1/22 208/48 AA |
| 5,494,607 | A * | 2/1996 | Manek | C10L 10/04 507/90 |
| 8,877,694 | B2 | 11/2014 | Jones et al. | |
| 9,102,791 | B2 | 8/2015 | Meyer | |
| 9,505,994 | B2 | 11/2016 | Ovaskainen et al. | |
| 10,138,417 | B2 | 11/2018 | Potisek et al. | |
| 10,280,714 | B2 | 5/2019 | Fouchard | |
| 10,669,470 | B2 | 6/2020 | Fouchard et al. | |

(Continued)

OTHER PUBLICATIONS

International Search Report and Written Opinion dated Apr. 4, 2022 relating to PCT/US2021/065398, 12 pages.

*Primary Examiner* — Ellen M McAvoy
(74) *Attorney, Agent, or Firm* — Stinson LLP

(57) ABSTRACT

An anti-fouling composition has been developed that provides an advantageous reduction in the fouling of a structural part in a petroleum-refining system including reducing coking reactions and inhibiting deposition of solids in equipment and lines used for crude oil production and processing. The anti-fouling compositions contain a resin comprising an alkyl phenol-aldehyde resin, a polyolefin comprising a polyalkylene ester, polyolefin amide alkeneamine, polyethylene polyamine, polyalkyleneimine, or a combination thereof; and optionally, a polyalkylene imide, an amine-substituted polyalkylene imide, or a combination thereof; and optionally, N,N'-disalicylidene-1,2-propanediamine.

20 Claims, 4 Drawing Sheets

(56) References Cited

U.S. PATENT DOCUMENTS

| | | |
|---|---|---|
| 2015/0011453 A1 | 1/2015 | Bennett et al. |
| 2016/0010006 A1* | 1/2016 | Subbiah ............... C10M 129/74 422/7 |
| 2016/0075649 A1* | 3/2016 | Ng .................... C07D 207/404 548/520 |
| 2017/0198204 A1* | 7/2017 | Nguyen ................... F17D 1/17 |
| 2017/0233666 A1 | 8/2017 | Solomon |
| 2017/0260464 A1* | 9/2017 | Ouni ...................... C10G 75/04 |
| 2018/0155644 A1* | 6/2018 | Sawhney ............... C08F 222/06 |
| 2018/0340115 A1 | 11/2018 | Fouchard et al. |
| 2019/0002783 A1 | 1/2019 | Gill et al. |
| 2019/0002788 A1 | 1/2019 | Gill et al. |
| 2019/0002795 A1 | 1/2019 | Gill et al. |
| 2019/0203131 A1* | 7/2019 | Yu .......................... C10G 75/02 |
| 2020/0002637 A1 | 1/2020 | van Houten et al. |
| 2020/0102513 A1 | 4/2020 | Gul et al. |

* cited by examiner

ANTI-FOULING COMPOSITIONS FOR USE IN CRUDE OIL PRODUCTION AND PROCESSING

CROSS REFERENCE TO RELATED APPLICATIONS

This application claims priority to U.S. Provisional Patent Application Ser. No. 63/131,272 filed on Dec. 28, 2020, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

An anti-fouling composition has been developed that provides an advantageous reduction in the fouling of a structural part in a petroleum-refining system including reducing coking reactions and inhibiting deposition of solids in equipment and lines used for crude oil production and processing. The antifoulant may also be used in the oil production processes. The anti-fouling compositions contain a resin comprising an alkyl phenol-aldehyde resin, a polyolefin comprising a polyalkylene ester, polyolefin amide alkeneamine, polyethylene polyamine, polyalkyleneimine, or a combination thereof; and optionally, a polyalkylene imide, an amine-substituted polyalkylene imide, or a combination thereof; and optionally, N,N'-disalicylidene-1,2-propanediamine.

BACKGROUND OF THE INVENTION

Petrochemicals and their feedstocks typically are heated to temperatures from about 35° C. to about 550° C. during processing. Additionally, petroleum hydrocarbons used as heating fluids in heating and heat exchange systems are heated to similarly high temperatures. When heated to such high temperatures, fouling deposits can form in the petroleum hydrocarbon. The fouling deposits can then form deposits on the surfaces of the processing and heating equipment that foul the surfaces.

The fouling deposits can reduce the rate of heat transfer to the crude oil or other hydrocarbon streams, and over time, can reduce the rate of throughput of the heat exchanger or furnaces. If not addressed, the fouling of the equipment can progress and block the flow of crude oil through processing equipment and piping or clog filter screens, valves, and traps. Thus, the fouling of the surfaces can result in increased energy costs, increased capital costs (e.g., modification or replacement of equipment), and increased maintenance costs (e.g., cleaning or replacing screens, filters, pipes, valves, traps, and the like).

Although, the exact mechanism of fouling is not known, several different components of crude oil or hydrocarbon stream can contribute to fouling. For example, asphaltenes, polynuclear aromatic hydrocarbons, coke, organic polymers, organic reaction products, inorganic silicates inorganic salts, metal oxides, metal sulfides, and the like are believed to contribute to the complex nature of fouling deposits in petroleum processing. Additionally, metal oxides and metal sulfides are believed to contribute to fouling by accelerating the petroleum hydrocarbon oxidation rate by promoting degenerative chain branching and forming free radicals. The free radicals formed can then react by oxidizing and polymerizing components of the petroleum to form gum, polymeric materials, and sediments.

With the constraints of a relatively low viscosity (e.g., less than 500 centipoise) and high stability, a need still exists for effective anti-coke and anti-fouling compositions that inhibit (i.e., reduce or prevent) fouling of the structure parts of a petroleum-refining system exposed to a hydrocarbon fluid.

BRIEF SUMMARY OF THE INVENTION

This disclosure is directed to anti-fouling compositions for inhibiting fouling of a structural part in a petroleum-refining system exposed to a hydrocarbon fluid, the anti-fouling composition comprising an effective amount of a resin comprising an alkyl phenol-aldehyde resin; and an effective amount of a polyolefin comprising a polyalkylene ester, polyolefin amide alkeneamine, polyethylene polyamine, polyalkyleneimine, or a combination thereof.

The anti-fouling compositions can further comprise an effective amount of a polyalkylene imide, an amine-substituted polyalkylene imide, or a combination thereof.

Additionally, the anti-fouling compositions described herein can further comprise an effective amount of a chelating compound comprising N,N'-disalicylidene-1,2-propanediamine.

The anti-fouling compositions have the alkyl phenol-aldehyde resin comprising an alkyl phenol-formaldehyde resin.

Additionally, the alkyl phenol-aldehyde resin comprises a $C_1$-$C_{20}$ alkyl phenol-aldehyde resin; preferably, a $C_1$-$C_{16}$ alkyl phenol-aldehyde resin; more preferably, a $C_1$-$C_{12}$ alkyl phenol-aldehyde resin; even more preferably, a $C_3$-$C_{12}$ alkyl phenol-aldehyde resin; even more preferably, a $C_6$-$C_{12}$ alkyl phenol-aldehyde resin; most preferably, a nonyl phenol-formaldehyde resin.

Further, the anti-fouling compositions comprise a polyalkylene ester of a polyalkylene succinic ester, a polyalkylene succinic anhydride, polyalkylene succinic acid, or a combination thereof; preferably, a polyethylene succinic ester, a polyethylene succinic anhydride, a polyethylene succinic acid, a polypropylene succinic ester, a polypropylene succinic anhydride, a polypropylene succinic acid, a polyisobutylene succinic ester, a polyisobutylene succinic anhydride, a polyisobutylene succinic acid, or a combination thereof; more preferably, the polyalkylene ester comprises a polyisobutylene succinic ester.

In the anti-fouling compositions, the polyisobutylene succinic ester is derived from a reaction of polyisobutylene succinic anhydride and a polyol. The polyol can comprise pentaerythritol, triethanolamine, glycerol, glucose, sucrose, arabitol, erythritol, maltitol, mannitol, ribitol, sorbitol, xylitol, threitol, galactitol, isomalt, iditol, lactitol, or a combination thereof. Preferably, the polyol comprises pentaerythritol.

The anti-fouling compositions can comprise the polyalkylene imide or the amine-substituted polyalkylene imide, wherein the polyalkylene imide is a polyalkylene succinimide and the amine-substituted polyalkylene imide is an amine-substituted polyalkylene succinimide; preferably, the polyalkylene succinimide is a polyethylene succinimide, a polyisopropylene succinimide, a polyisobutylene succinimide, or a combination thereof; and the amine-substituted polyalkylene succinimide is an amine-substituted polyethylene succinimide, an amine-substituted polyisopropylene succinimide, an amine-substituted polyisobutylene succinimide, or a combination thereof.

The anti-fouling compositions can also comprise a chelating compound comprising N,N'-disalicylidene-1,2-propanediamine.

The anti-fouling compositions have the resin present at a concentration from about 1 to about 99 wt. %, and the polyolefin present at a concentration from about 1 to about 99 wt. %, based on the total weight of the resin and the polyolefin; preferably, the resin is present at a concentration from about 20 to about 80 wt. %, and the polyolefin is present at a concentration from about 20 to about 80 wt. %, based on the total weight of the resin and the polyolefin.

Additionally, the anti-fouling compositions have the resin present at a concentration from about 10 to about 80 wt. %, the polyolefin present at a concentration from about 10 to about 80 wt. %, and the chelator present at a concentration from about 1 to about 25 wt. %, based on the total weight of the resin, the polyolefin, and the chelator; preferably, the resin is present at a concentration from about 20 to about 70 wt. %, the polyolefin is present at a concentration from about 20 to about 70 wt. %, and the chelator is present at a concentration from about 5 to about 15 wt. %, based on the total weight of the resin, the polyolefin, and the chelator.

Also, disclosed herein is a method for reducing or preventing fouling of a structural part in a petroleum-refining system exposed to a hydrocarbon fluid, comprising contacting the structural part with an effective amount of the anti-fouling composition described herein.

A method for reducing or preventing fouling of a structural part in a petroleum-refining system exposed to a hydrocarbon fluid is also disclosed, the method comprises contacting the structural part with the anti-fouling composition described herein.

In the methods for reducing or preventing fouling of a structural part in a petroleum-refining system exposed to a hydrocarbon fluid, the hydrocarbon fluid can be a petrochemical fluid.

In the methods for reducing or preventing fouling of a structural part in a petroleum-refining system exposed to a hydrocarbon fluid, the petrochemical fluid can comprise an asphaltene, a paraffin, a wax, a scale, a naphthenate, coke, or a combination thereof.

The methods described herein have the anti-fouling composition be contacted with the petrochemical fluid in an effective amount to disperse a foulant precursor.

Also, the methods described herein have the anti-fouling composition be contacted with the petrochemical fluid in an effective amount to prevent or reduce deposition of a foulant.

In the disclosed methods, the anti-fouling composition can be contacted with the petrochemical fluid in an effective amount to disperse asphaltene.

In the disclosed methods, the anti-fouling composition can be contacted with the petrochemical fluid in an effective amount to prevent or reduce deposition of coke.

Additionally, in the disclosed methods, the anti-fouling composition can be contacted with the petrochemical fluid in an effective amount to prevent or reduce deposition of a foulant.

In the disclosed methods, the structural part in a petroleum-refining system can comprise a part of a storage unit, a heat exchanger, a pipe, a pump, a flow meter, a valve, a desalter, a furnace, a coker, a distillation column, a fractionation column, an atmospheric column, a pipe still, a debutanizer, a reactor, a fluid catalytic cracking unit, a fluid catalytic cracking slurry settler, a hydrocracking unit, a steam cracking unit, a thermal cracking unit, a visbreaker, a reflux unit, a condenser, a scrubber, or a combination thereof. Preferably, the structural part can comprise part of a heat exchangers, a crude processing unit, a fluid catalytic cracking unit, a fluid catalytic cracking slurry settler, a hydrocracking unit, a steam cracking unit, a thermal cracking unit, a visbreaker, or a combination thereof. More preferably, the structural part can comprise part of a fluid catalytic cracking unit, a visbreaker, or a combination thereof In the methods for reducing or preventing fouling of a structural part in a petroleum-refining system exposed to a hydrocarbon fluid, the effective amount of the anti-fouling composition is from about 1 ppm to about 50,000 ppm, or from about 1 ppm to about 500 ppm of the anti-fouling composition based on the total amount of hydrocarbon fluid.

Other objects and features will be in part apparent and in part pointed out hereinafter.

DETAILED DESCRIPTION OF THE INVENTION

Figure 1:
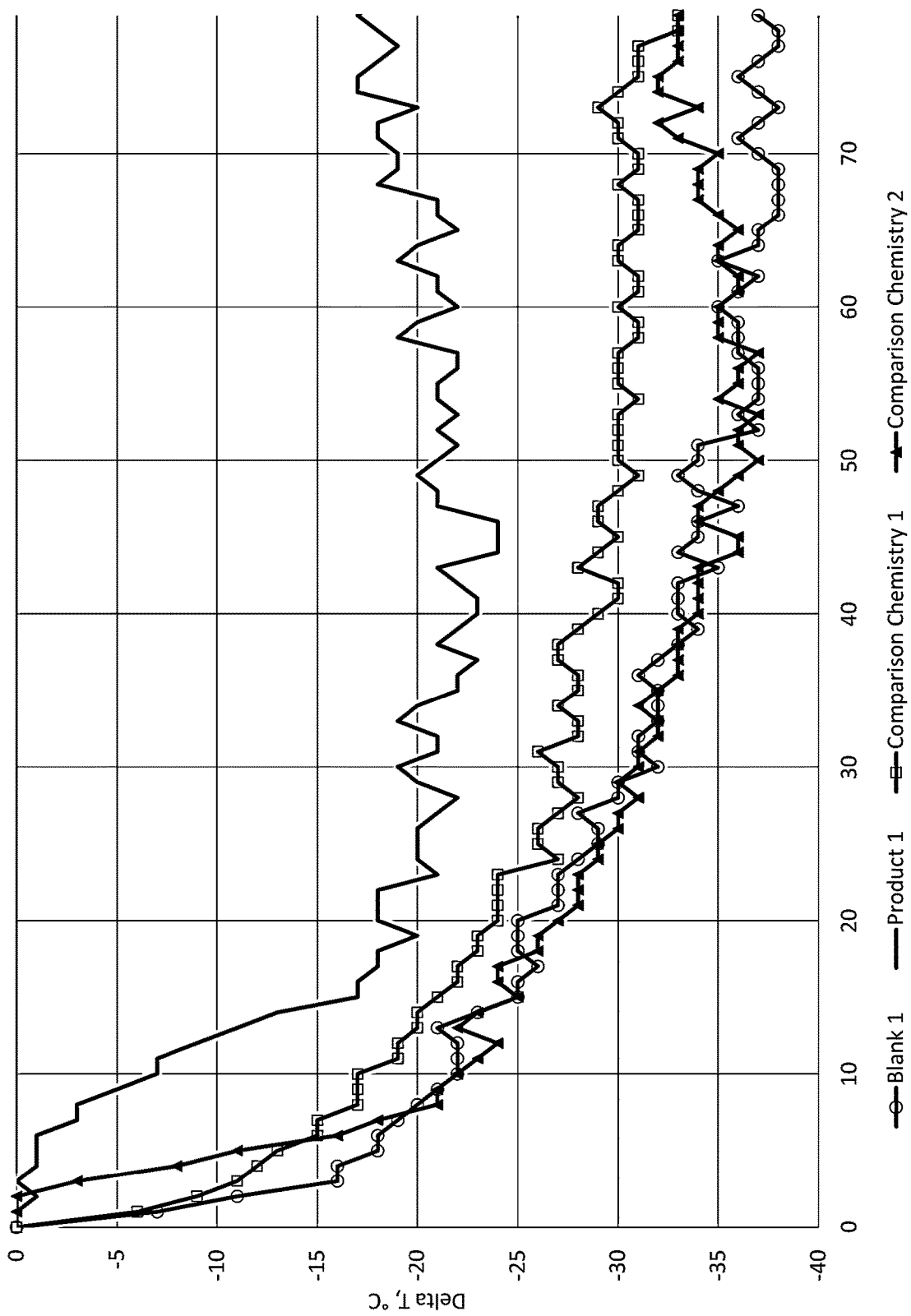
FIG. 1 and FIG. 2 show graphs of the temperature difference between the inlet and outlet temperatures versus time in the hot liquid process simulator (HLPS) test using various reagents.

Anti-fouling compositions are disclosed that can be used in methods of inhibiting (e.g., reducing or preventing) fouling of a structural part in a petroleum-refining system exposed to a hydrocarbon fluid. The anti-fouling compositions reduce deposition of fouling compounds on the surfaces of the structural parts in a petroleum-refining system as well as production. Without being bound to a particular theory, it is believed that the components of the anti-fouling composition provide more than one mechanism of action with one component chelating the metals in hydrocarbons to make them chemically inactive while another component or components of the composition disperses a component of the hydrocarbon fluid, in particular, the other component disperses asphaltenes/foulant precursors in the hydrocarbon fluid.

The anti-fouling compositions described herein can be used for inhibiting fouling of a structural part in a petroleum-refining system exposed to a hydrocarbon fluid. This disclosure is directed to anti-fouling compositions for inhibiting fouling of a structural part in a petroleum-refining system exposed to a hydrocarbon fluid, the anti-fouling composition comprising an effective amount of a resin comprising an alkyl phenol-aldehyde resin; and an effective amount of a polyolefin comprising a polyalkylene ester, polyolefin amide, alkeneamine, polyethylene polyamine, polyalkyleneimine, or a combination thereof.

The anti-fouling compositions can further comprise an effective amount of a polyalkylene imide, an amine-substituted polyalkylene imide, or a combination thereof.

Additionally, the anti-fouling compositions described herein can further comprise an effective amount of a chelating compound comprising N,N'-disalicylidene-1,2-propanediamine.

The anti-fouling compositions have the alkyl phenol-aldehyde resin comprising an alkyl phenol-formaldehyde resin.

Additionally, the alkyl phenol-aldehyde resin comprises a $C_1$-$C_{20}$ alkyl phenol-aldehyde resin; preferably, a $C_1$-$C_{16}$ alkyl phenol-aldehyde resin; more preferably, a $C_1$-$C_{12}$ alkyl phenol-aldehyde resin; even more preferably, a $C_3$-$C_{12}$ alkyl phenol-aldehyde resin; even more preferably, a $C_6$-$C_{12}$ alkyl phenol-aldehyde resin.

A preferred nonyl phenol-formaldehyde resin was prepared by the polycondensation of a mixture of nonyl- and dinonylphenols (in a mole ratio of about 10:1) with formaldehyde in a heavy aromatic solvent. The preferred nonyl phenol-formaldehyde resin has a weight average molecular weight determined by gel permeation chromatography of about 3200 Daltons.

The alkyl phenol-formaldehyde resins can have the structure of Formula

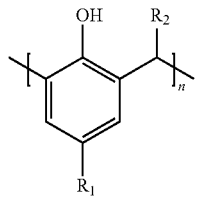

wherein $R_1$ is $C_1$-$C_{20}$ alkyl, $R_2$ is hydrogen, $C_1$ to $C_6$ alkyl, or alkaryl, and n is an integer from 4 to 75.

Preferably, for the resins of Formula 1, $R_1$ is $C_1$-$C_{15}$ alkyl, $C_1$-$C_{12}$ alkyl, $C_3$-$C_{12}$ alkyl, $C_6$-$C_{12}$ alkyl; most preferably nonyl.

Additionally, the resins of Formula 1 preferably have $R_2$ of hydrogen.

Also, the resins of Formula 1 preferably have n as an integer from 10 to 20.

Further, the anti-fouling compositions comprise a polyalkylene ester of a polyalkylene succinic ester, a polyalkylene succinic anhydride, polyalkylene succinic acid, or a combination thereof; preferably, a polyethylene succinic ester, a polyethylene succinic anhydride, a polyethylene succinic acid, a polypropylene succinic ester, a polypropylene succinic anhydride, a polypropylene succinic acid, a polyisobutylene succinic ester, a polyisobutylene succinic anhydride, a polyisobutylene succinic acid, or a combination thereof; more preferably, the polyalkylene ester comprises a polyisobutylene succinic ester.

In the anti-fouling compositions, the polyisobutylene succinic ester is derived from a reaction of polyisobutylene succinic anhydride and a polyol. The polyol can comprise pentaerythritol, triethanolamine, glycerol, glucose, sucrose, arabitol, erythritol, maltitol, mannitol, ribitol, sorbitol, xylitol, threitol, galactitol, isomalt, iditol, lactitol, or a combination thereof. Preferably, the polyol comprises pentaerythritol.

A polyisobutenylene (PIB) having a number average molecular weight of 500 to 4200 is reacted with pentaerythritol at from about 160 to about 230° C. in the presence of a catalyst. The PIB portion is modified based on the performance needed for particular crude oil characteristics.

The preferred polyisobutenylene pentaerythritol ester can have the structure

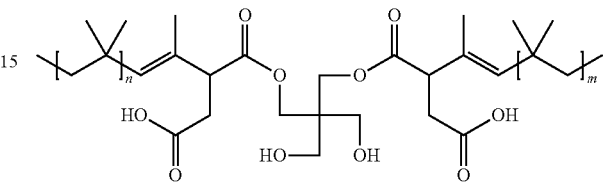

wherein n and m are integers from 2 to 16.

The anti-fouling compositions can comprise the polyalkylene imide or the amine-substituted polyalkylene imide, wherein the polyalkylene imide is a polyalkylene succinimide and the amine-substituted polyalkylene imide is an amine-substituted polyalkylene succinimide; preferably, the polyalkylene succinimide is a polyethylene succinimide, a polyisopropylene succinimide, a polyisobutylene succinimide, or a combination thereof; and the amine-substituted polyalkylene succinimide is an amine-substituted polyethylene succinimide, an amine-substituted polyisopropylene succinimide, an amine-substituted polyisobutylene succinimide, or a combination thereof.

The anti-fouling compositions can also comprise a chelating compound comprising N,N'-disalicylidene-1,2-propanediamine.

The anti-fouling compositions having a resin and a polyolefin have the resin present at a concentration from about 1 to about 99 wt. %, from about 1 to about 90 wt. %, from about 1 to about 80 wt. %, from about 1 to about 70 wt. %, from about 1 to about 65 wt. %, from about 1 to about 60 wt. %, from about 1 to about 55 wt. %, from about 1 to about 50 wt. %, from about 1 to about 45 wt. %, from about 10 to about 99 wt. %, from about 10 to about 90 wt. %, from about 10 to about 80 wt. %, from about 10 to about 70 wt. %, from about 10 to about 65 wt. %, from about 10 to about 60 wt. %, from about 10 to about 55 wt. %, from about 10 to about 50 wt. %, from about 10 to about 45 wt. %, from about 20 to about 99 wt. %, from about 20 to about 90 wt. %, from about 20 to about 80 wt. %, from about 20 to about 70 wt. %, from about 20 to about 65 wt. %, from about 20 to about 60 wt. %, from about 20 to about 55 wt. %, from about 20 to about 50 wt. %, from about 20 to about 45 wt. %, from about 25 to about 99 wt. %, from about 25 to about 90 wt. %, from about 25 to about 80 wt. %, from about 25 to about 70 wt. %, from about 25 to about 65 wt. %, from about 25 to about 60 wt. %, from about 25 to about 55 wt. %, from about 25 to about 50 wt. %, from about 25 to about 45 wt. %, from about 30 to about 99 wt. %, from about 30 to about 90 wt. %, from about 30 to about 80 wt. %, from about 30 to about 70 wt. %, from about 30 to about 65 wt. %, from about 30 to about 60 wt. %, from about 30 to about 55 wt. %, from about 30 to about 50 wt. %, from about 30 to about 45 wt. %, from about 35 to about 99 wt. %, from about 35 to about 90 wt. %, from about 35 to about 80 wt. %, from about 35 to about 70 wt. %, from about 35 to about 65 wt.

%, from about 35 to about 60 wt. %, from about 35 to about 55 wt. %, from about 35 to about 50 wt. %, from about 35 to about 45 wt. %, from about 40 to about 99 wt. %, from about 40 to about 90 wt. %, from about 40 to about 80 wt. %, from about 40 to about 70 wt. %, from about 40 to about 65 wt. %, from about 40 to about 60 wt. %, from about 40 to about 55 wt. %, from about 40 to about 50 wt. %, or from about 40 to about 45 wt. % based on the total weight of the resin and the polyolefin.

The anti-fouling compositions having a resin and a polyolefin have the polyolefin present at a concentration from about 1 to about 99 wt. %, from about 1 to about 90 wt. %, from about 1 to about 80 wt. %, from about 1 to about 70 wt. %, from about 1 to about 65 wt. %, from about 1 to about 60 wt. %, from about 1 to about 55 wt. %, from about 1 to about 50 wt. %, from about 1 to about 45 wt. %, from about 10 to about 99 wt. %, from about 10 to about 90 wt. %, from about 10 to about 80 wt. %, from about 10 to about 70 wt. %, from about 10 to about 65 wt. %, from about 10 to about 60 wt. %, from about 10 to about 55 wt. %, from about 10 to about 50 wt. %, from about 10 to about 45 wt. %, from about 20 to about 99 wt. %, from about 20 to about 90 wt. %, from about 20 to about 80 wt. %, from about 20 to about 70 wt. %, from about 20 to about 65 wt. %, from about 20 to about 60 wt. %, from about 20 to about 55 wt. %, from about 20 to about 50 wt. %, from about 20 to about 45 wt. %, from about 25 to about 99 wt. %, from about 25 to about 90 wt. %, from about 25 to about 80 wt. %, from about 25 to about 70 wt. %, from about 25 to about 65 wt. %, from about 25 to about 60 wt. %, from about 25 to about 55 wt. %, from about 25 to about 50 wt. %, from about 25 to about 45 wt. %, from about 30 to about 99 wt. %, from about 30 to about 90 wt. %, from about 30 to about 80 wt. %, from about 30 to about 70 wt. %, from about 30 to about 65 wt. %, from about 30 to about 60 wt. %, from about 30 to about 55 wt. %, from about 30 to about 50 wt. %, from about 30 to about 45 wt. %, from about 35 to about 99 wt. %, from about 35 to about 90 wt. %, from about 35 to about 80 wt. %, from about 35 to about 70 wt. %, from about 35 to about 65 wt. %, from about 35 to about 60 wt. %, from about 35 to about 55 wt. %, from about 35 to about 50 wt. %, from about 35 to about 45 wt. %, from about 40 to about 99 wt. %, from about 40 to about 90 wt. %, from about 40 to about 80 wt. %, from about 40 to about 70 wt. %, from about 40 to about 65 wt. %, from about 40 to about 60 wt. %, from about 40 to about 55 wt. %, from about 40 to about 50 wt. %, or from about 40 to about 45 wt. % based on the total weight of the resin and the polyolefin.

Additionally, the anti-fouling compositions having a resin, polyolefin, and a chelator have the resin present at a concentration from about 10 to about 80 wt. %, from about 10 to about 70 wt. %, from about 10 to about 65 wt. %, from about 10 to about 60 wt. %, from about 10 to about 55 wt. %, from about 10 to about 50 wt. %, from about 10 to about 45 wt. %, from about 20 to about 80 wt. %, from about 20 to about 70 wt. %, from about 20 to about 65 wt. %, from about 20 to about 60 wt. %, from about 20 to about 55 wt. %, from about 20 to about 50 wt. %, from about 20 to about 45 wt. %, from about 25 to about 80 wt. %, from about 25 to about 70 wt. %, from about 25 to about 65 wt. %, from about 25 to about 60 wt. %, from about 25 to about 55 wt. %, from about 25 to about 50 wt. %, from about 25 to about 45 wt. %, from about 30 to about 80 wt. %, from about 30 to about 70 wt. %, from about 30 to about 65 wt. %, from about 30 to about 60 wt. %, from about 30 to about 55 wt. %, from about 30 to about 50 wt. %, from about 30 to about 45 wt. %, from about 35 to about 80 wt. %, from about 35 to about 70 wt. %, from about 35 to about 65 wt. %, from about 35 to about 60 wt. %, from about 35 to about 55 wt. %, from about 35 to about 50 wt. %, from about 35 to about 45 wt. %, from about 40 to about 80 wt. %, from about 40 to about 70 wt. %, from about 40 to about 65 wt. %, from about 40 to about 60 wt. %, from about 40 to about 55 wt. %, from about 40 to about 50 wt. %, or from about 40 to about 45 wt. %, based on the total weight of the resin, the polyolefin, and the chelator.

The anti-fouling compositions having a resin, polyolefin, and a chelator have the polyolefin present at a concentration from about 10 to about 80 wt. %, from about 10 to about 70 wt. %, from about 10 to about 65 wt. %, from about 10 to about 60 wt. %, from about 10 to about 55 wt. %, from about 10 to about 50 wt. %, from about 10 to about 45 wt. %, from about 20 to about 80 wt. %, from about 20 to about 70 wt. %, from about 20 to about 65 wt. %, from about 20 to about 60 wt. %, from about 20 to about 55 wt. %, from about 20 to about 50 wt. %, from about 20 to about 45 wt. %, from about 25 to about 80 wt. %, from about 25 to about 70 wt. %, from about 25 to about 65 wt. %, from about 25 to about 60 wt. %, from about 25 to about 55 wt. %, from about 25 to about 50 wt. %, from about 25 to about 45 wt. %, from about 30 to about 80 wt. %, from about 30 to about 70 wt. %, from about 30 to about 65 wt. %, from about 30 to about 60 wt. %, from about 30 to about 55 wt. %, from about 30 to about 50 wt. %, from about 30 to about 45 wt. %, from about 35 to about 80 wt. %, from about 35 to about 70 wt. %, from about 35 to about 65 wt. %, from about 35 to about 60 wt. %, from about 35 to about 55 wt. %, from about 35 to about 50 wt. %, from about 35 to about 45 wt. %, from about 40 to about 80 wt. %, from about 40 to about 70 wt. %, from about 40 to about 65 wt. %, from about 40 to about 60 wt. %, from about 40 to about 55 wt. %, from about 40 to about 50 wt. %, or from about 40 to about 45 wt. %, based on the total weight of the resin, the polyolefin, and the chelator.

The anti-fouling compositions having a resin, polyolefin, and a chelator have the chelator present at a concentration from about 1 to about 25 wt. %, from about 1 to about 20 wt. %, from about 1 to about 15 wt. %, from about 5 to about 25 wt. %, from about 5 to about 20 wt. %, from about 5 to about 15 wt. %, from about 10 to about 25 wt. %, from about 10 to about 20 wt. %, or from about 10 to about 15 wt. %, based on the total weight of the resin, the polyolefin, and the chelator.

Also, disclosed herein is a method for reducing or preventing fouling of a structural part in a petroleum-refining system and/or the production system exposed to a hydrocarbon fluid, comprising contacting the structural part with an effective amount of the anti-fouling composition described herein.

A method for reducing or preventing fouling of a structural part in a petroleum-refining system and/or the production system exposed to a hydrocarbon fluid is also disclosed, the method comprises contacting the structural part with the anti-fouling composition described herein.

In the methods for reducing or preventing fouling of a structural part in a petroleum-refining system and/or the production system exposed to a hydrocarbon fluid, the hydrocarbon fluid can be a petrochemical fluid.

In the methods for reducing or preventing fouling of a structural part in a petroleum-refining system and/or the production system exposed to a hydrocarbon fluid, the petrochemical fluid can comprise an asphaltene, a paraffin, a wax, a scale, a naphthenate, coke, or a combination thereof.

The methods described herein have the anti-fouling composition be contacted with the petrochemical fluid in an effective amount to disperse a foulant precursor.

Also, the methods described herein have the anti-fouling composition be contacted with the petrochemical fluid in an effective amount to prevent or reduce deposition of a foulant.

In the disclosed methods, the anti-fouling composition can be contacted with the petrochemical fluid in an effective amount to disperse asphaltene.

In the disclosed methods, the anti-fouling composition can be contacted with the petrochemical fluid in an effective amount to prevent or reduce deposition of coke.

Additionally, in the disclosed methods, the anti-fouling composition can be contacted with the petrochemical fluid in an effective amount to prevent or reduce deposition of a foulant.

In the disclosed methods, the structural part in a petroleum-refining system can comprise a part of a production, a storage unit, a heat exchanger, a pipe, a pump, a flow meter, a valve, a desalter, a furnace, a coker, a distillation column, a fractionation column, an atmospheric column, a pipe still, a debutanizer, a reactor, a fluid catalytic cracking unit, a fluid catalytic cracking slurry settler, a hydrocracking unit, a steam cracking unit, a thermal cracking unit, a visbreaker, a reflux unit, a condenser, a scrubber, or a combination thereof. Preferably, the structural part can comprise part of a heat exchanger, a crude processing unit, a fluid catalytic cracking unit, a fluid catalytic cracking slurry settler, a hydrocracking unit, a steam cracking unit, a thermal cracking unit, a visbreaker, or a combination thereof. More preferably, the structural part can comprise part of a crude processing unit, a visbreaker, or a combination thereof The anti-fouling composition can further consist essentially of a resin and a polyolefin as described herein. The anti-fouling composition consisting essentially of these components has the novel properties of acceptable reduction or prevention of deposition of the foulants in the hydrocarbon fluid in contact with the structural parts in a petroleum-refining system exposed to the hydrocarbon fluid when used in the methods described herein.

The anti-fouling composition can further consist essentially of a resin, a polyolefin, and a chelator as described herein. The anti-fouling composition consisting essentially of these components has the novel properties of acceptable reduction or prevention of deposition of the foulants in the hydrocarbon fluid in contact with the structural parts in a petroleum-refining system exposed to the hydrocarbon fluid when used in the methods described herein.

In the methods for reducing or preventing deposition of a component of a crude oil, the effective amount of the anti-fouling composition is from about 1 ppm to about 50,000 ppm, from about 1 ppm to about 40,000 ppm, from about 1 ppm to about 30,000 ppm, from about 1 ppm to about 20,000 ppm, from about 1 ppm to about 10,000 ppm, from about 1 ppm to about 7,500 ppm, from about 1 ppm to about 5,000 ppm, from about 1 ppm to about 2,500 ppm, from about 1 ppm to about 2,000 ppm, from about 1 ppm to about 1,500 ppm, from about 1 ppm to about 1,000 ppm, from about 1 ppm to about 500 ppm, from about 1 ppm to about 100 ppm, from about 5 ppm to about 50,000 ppm, from about 5 ppm to about 40,000 ppm, from about 5 ppm to about 30,000 ppm, from about 5 ppm to about 20,000 ppm, from about 5 ppm to about 10,000 ppm, from about 5 ppm to about 7,500 ppm, from about 5 ppm to about 5,000 ppm, from about 5 ppm to about 2,500 ppm, from about 5 ppm to about 2,000 ppm, from about 5 ppm to about 1,500 ppm, from about 5 ppm to about 1,000 ppm, from about 5 ppm to about 500 ppm, or from about 5 ppm to about 100 ppm of the anti-fouling composition based on the total amount of hydrocarbon fluid.

Definitions

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups may be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl (allyl), iso-propenyl, 2-methyl-1-propenyl, 1-butenyl, and 2-butenyl. Alkenyl groups may be unsubstituted or substituted by one or more suitable substituents, as defined above.

The term "alkynyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups may be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "arylalkyl," as used herein, refers to an aryl group attached to the parent molecular moiety through an alkyl group. Arylalkyl groups may be unsubstituted or substituted by one or more suitable substituents, as defined above.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms (e.g., 1 to 3 heteroatoms) selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2, 3-oxadiazolyl), thiadiazolyl (e.g., 1,3,4-thiadiazolyl), quinolyl, isoquinolyl, benzothienyl, benzofuryl, and indolyl. Heteroaryl groups may be unsubstituted or substituted by one or more suitable substituents, preferably 1 to 5 suitable substituents, as defined above.

The term "heterocycle" or "heterocyclyl," as used herein, refers to a monocyclic, bicyclic, or tricyclic group containing 1 to 4 heteroatoms selected from N, O, S(O)n, P(O)n, PRz, NH or NRz, wherein Rz is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydrothiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups may be unsubstituted or substituted by one or more suitable substituents, preferably 1 to 3 suitable substituents, as defined above.

The term "hydroxy," as used herein, refers to an —OH group.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

Having described the invention in detail, it will be apparent that modifications and variations are possible without departing from the scope of the invention defined in the appended claims.

EXAMPLES

The following non-limiting examples are provided to further illustrate the present invention.

Example 1: Hot Liquid Process Simulator (HLPS)

HLPS is an industry accepted test method to evaluate antifoulant chemistry performance. In this test a desalted crude oil is used. The test conditions employed are as follows: (a) Rod Temperature: 400° C.; Flow Rate: 1 mL/min; Pressure: 500 psi; and Reaction time: 80 min.

Figure 2:
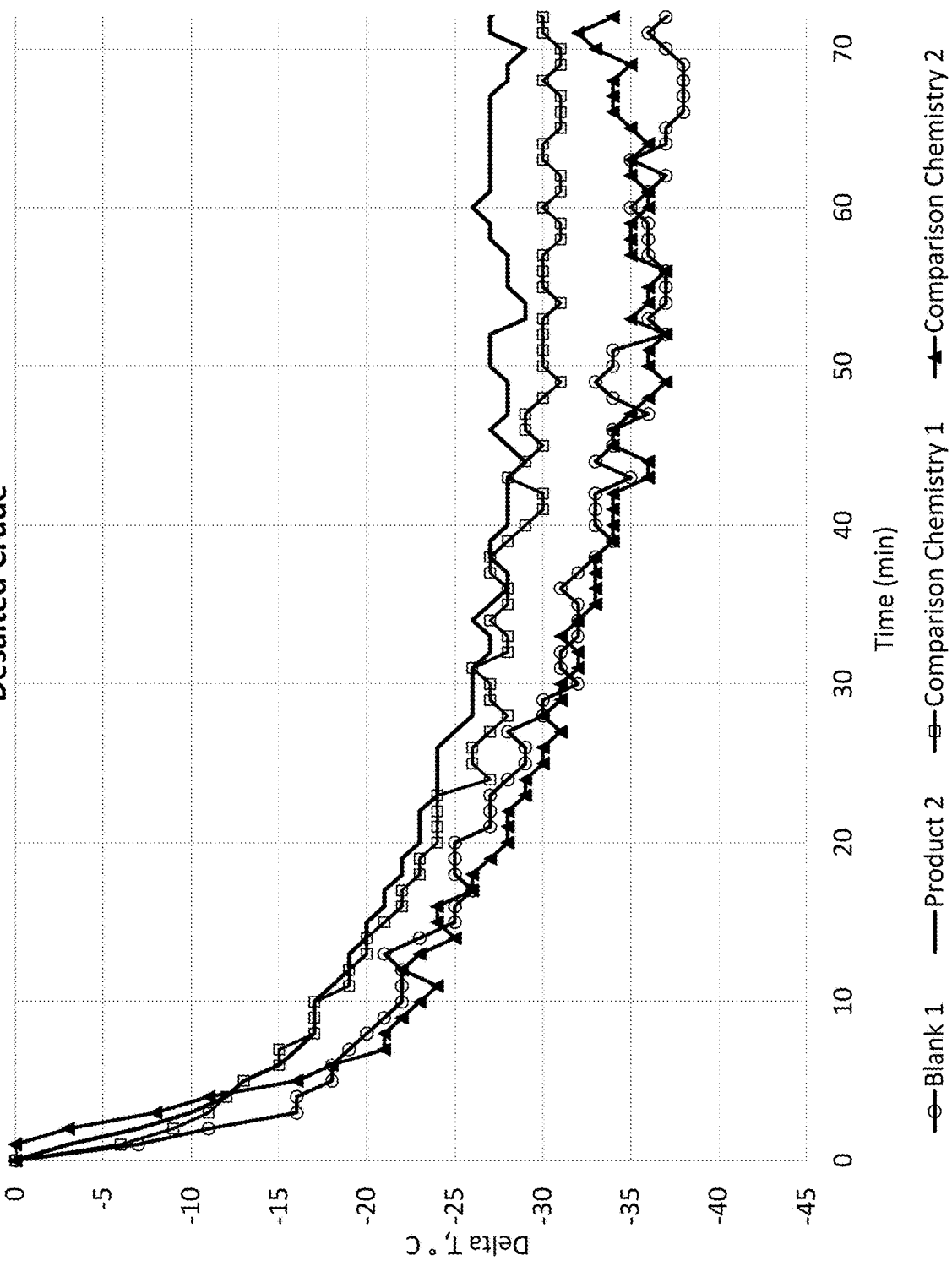

In the HLPS test, a homogenized crude oil sample is passed through a heated zone at a given flow rate. During this test, the inlet, outlet, and the rod temperatures are measured and recorded. The foulant precursors are destabilized while passing through the heated zone and tend to precipitate and stick to the heated rod resulting in reduced outlet temperature. The test is repeated with antifoulant-dosed-desalted crude having an antifoulant concentration of 3000 ppm. Then, the fouling curves from these tests are compared for a performance improvement. The results for the anti-fouling composition containing Product 1 (50 wt. % polyisobutenyl succinic acid pentaerythritol ester (Comparison Chemistry 1)) and 50 wt. % 4-nonyl phenol formaldehyde resin (Comparison Chemistry 2)) and results for polyisobutenyl succinic acid pentaerythritol ester (Comparison Chemistry 1) and 4-nonyl phenol formaldehyde resin (Comparison Chemistry 2) at 3000 ppm doses are shown FIG. 1. Results for the anti-fouling composition containing Product 2 (43.5 wt. % polyisobutenyl succinic acid pentaerythritol ester (Comparison Chemistry 1), 43.5 wt. % 4-nonyl phenol formaldehyde resin (Comparison Chemistry 2), and 13 wt. % N,N'-disalicylidene-1,2-propane diamine in xylene) and results for polyisobutenyl succinic acid pentaerylthritol ester (Comparison Chemistry 1) and 4-nonyl phenol formaldehyde resin (Comparison Chemistry 2) at 3000 ppm are shown in FIG. 2.

Example 2: Asphaltene Dispersancy Test (ADT)

Figure 3:
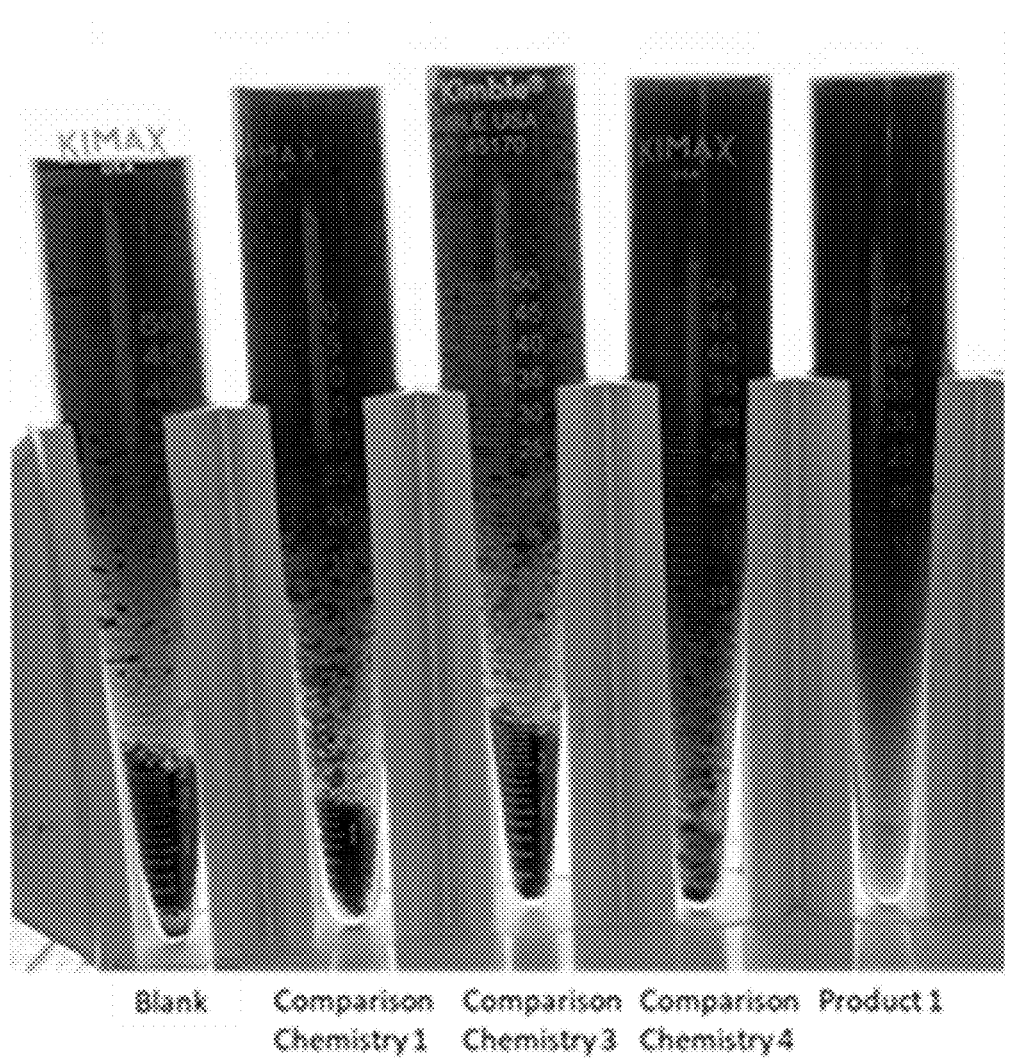
FIG. 3 and FIG. 4 show pictures of the results of the asphaltene dispersancy test (ADT) using various reagents at 50 ppm dose.

A 500 µl of crude oil is taken into test tubes. The first tube is left as "blank" while others have been dosed with antifoulant chemistries at 50 ppm. The precipitate quantities in each test tube is recorded and compared to the blank. The anti-fouling composition containing Product 1 (50 wt. % polyisobutenyl succinic acid pentaerylthritol ester (Comparison Chemistry 1) and 50 wt. % 4-nonyl phenol formaldehyde resin (Comparison Chemistry 2)), and results for polyisobutenyl succinic acid pentaerylthritol ester (Comparison Chemistry 1), Comparison Chemistry 3, and Comparison Chemistry 4 at 50 ppm dose are shown FIG. 3. The Product 1 anti-fouling composition showed the best asphaltene dispersancy of those agents tested as evidenced by the least precipitate and clearest solution.

Figure 4:
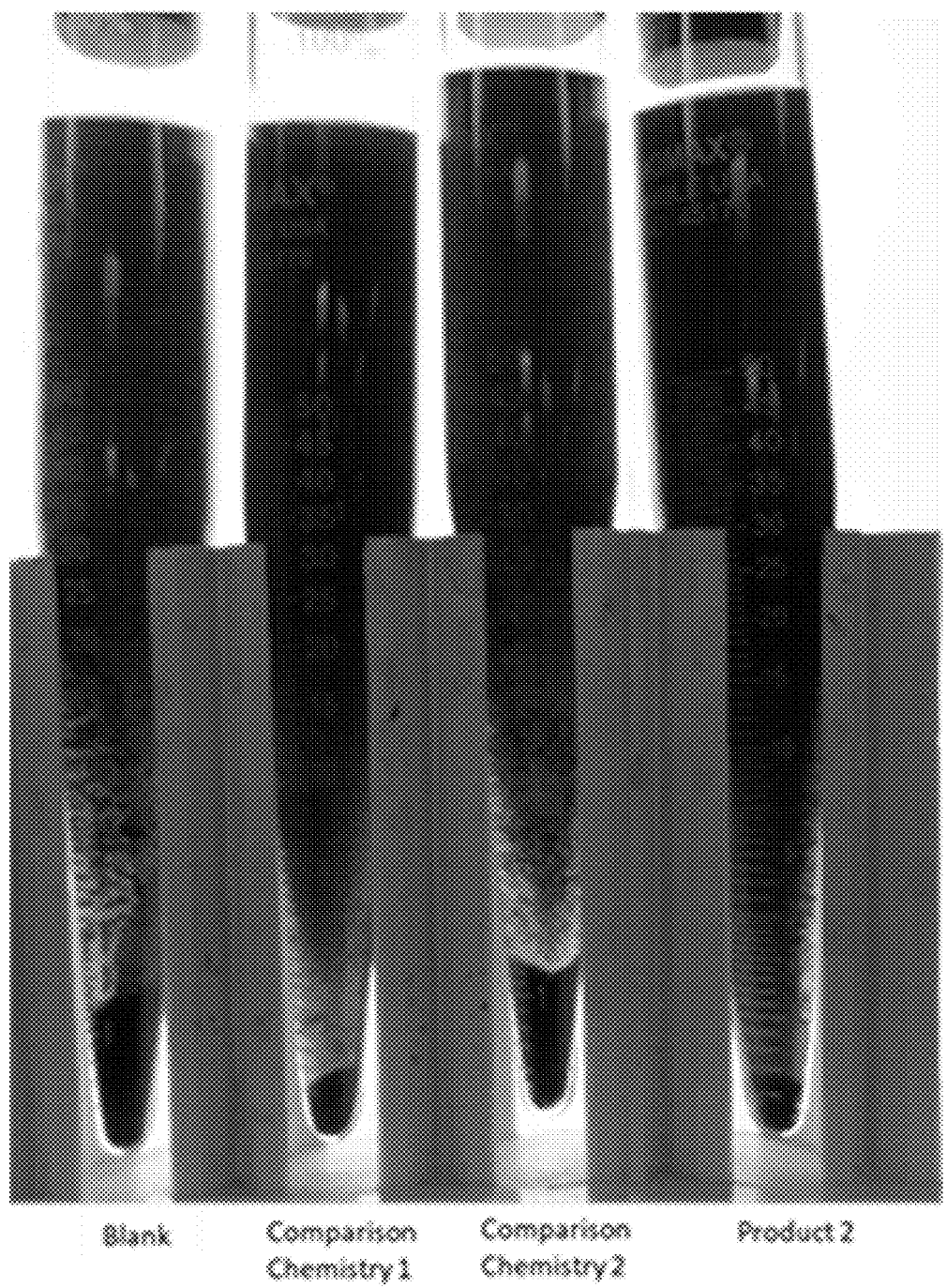

Results for the anti-fouling composition containing Product 2 (43.5 wt. % polyisobutenyl succinic acid pentaerylthritol ester (Comparison Chemistry 1), 43.5 wt. % 4-nonyl phenol formaldehyde resin (Comparison Chemistry 2), and 13 wt. % N,N'-disalicylidene-1,2-propane diamine), and each of Comparison Chemistry 1 and Comparison Chemistry 2 alone at a dose of 50 ppm are shown in FIG. 4. The Product 2 anti-fouling composition showed advantageous asphaltene dispersancy as evidenced by the amount precipitate and clarity of solution.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

The invention claimed is:

1. An anti-fouling composition for inhibiting fouling of a structural part in a petroleum-refining system exposed to a hydrocarbon fluid, the anti-fouling composition comprising:
    an effective amount of a resin comprising an alkyl phenol-aldehyde resin; and an effective amount of a polyolefin comprising a polyalkylene ester, polyolefin amide alkeneamine, or a combination thereof, wherein the anti-fouling composition inhibits fouling of a structural part in a petroleum-refining system exposed to a hydrocarbon fluid.

2. The anti-fouling composition of claim 1, the composition further comprising an effective amount of a polyalkylene imide, an amine-substituted polyalkylene imide, or a combination thereof.

3. The anti-fouling composition of claim 2, comprising the polyalkylene imide or the amine-substituted polyalkylene imide, wherein the polyalkylene imide is a polyalkylene succinimide and the amine-substituted polyalkylene imide is an amine-substituted polyalkylene succinimide.

4. The anti-fouling composition of claim 3, wherein the polyalkylene succinimide is a polyethylene succinimide, a polyisopropylene succinimide, a polyisobutylene succinimide, or a combination thereof; and the amine-substituted polyalkylene succinimide is an amine-substituted polyethylene succinimide, an amine-substituted polyisopropylene succinimide, an amine-substituted polyisobutylene succinimide, or a combination thereof.

5. The anti-fouling composition of claim 1, the composition further comprising an effective amount of a chelating compound comprising N,N'-disalicylidene-1,2-propanediamine.

6. The anti-fouling composition of claim 1, wherein the alkyl phenol-aldehyde resin comprises an alkyl phenol-formaldehyde resin.

7. The anti-fouling composition of claim 6, wherein the alkyl phenol-aldehyde resin comprises a $C_1$-$C_{20}$ alkyl phenol-aldehyde resin.

8. The anti-fouling composition of claim 7, wherein the alkyl phenol-aldehyde resin comprises a nonyl phenol-formaldehyde resin.

9. The anti-fouling composition of claim 1, comprising the polyalkylene ester, wherein the polyalkylene ester comprises a polyalkylene succinic ester, a polyalkylene succinic anhydride, polyalkylene succinic acid, or a combination thereof.

10. The anti-fouling composition of claim 9, wherein the polyalkylene ester comprises a polyethylene succinic ester, a polyethylene succinic anhydride, a polyethylene succinic acid, a polypropylene succinic ester, a polypropylene succinic anhydride, a polypropylene succinic acid, a polyisobutylene succinic ester, a polyisobutylene succinic anhydride, a polyisobutylene succinic acid, or a combination thereof.

11. The anti-fouling composition of claim 9, wherein the polyalkylene ester comprises a polyisobutylene succinic ester.

12. The anti-fouling composition of claim 11, wherein the polyisobutylene succinic ester is derived from a reaction of polyisobutylene succinic anhydride and a polyol.

13. The anti-fouling composition of claim 12, wherein the polyol comprises pentaerythritol, triethanolamine, glycerol, glucose, sucrose, arabitol, erythritol, maltitol, mannitol, ribitol, sorbitol, xylitol, threitol, galactitol, isomalt, iditol, lactitol, or a combination thereof.

14. The anti-fouling composition of claim 12, wherein the polyol comprises pentaerythritol.

15. The anti-fouling composition of claim 1, wherein the resin is present at a concentration from about 20 to about 80 wt. %, and the polyolefin is present at a concentration from about 20 to about 80 wt. %, based on the total weight of the resin and the polyolefin.

16. A method for reducing or preventing fouling of a structural part in a petroleum-refining system exposed to a hydrocarbon fluid, comprising contacting the structural part with an effective amount of the anti-fouling composition of claim 1.

17. The method of claim 16, wherein the hydrocarbon fluid is a petrochemical fluid, and the petrochemical fluid comprises an asphaltene, a paraffin, a wax, a scale, a naphthenate, coke, or a combination thereof.

18. The method of claim 17, wherein the anti-fouling composition is contacted with the petrochemical fluid in an effective amount to disperse asphaltene or to prevent or reduce deposition of coke.

19. The method of claim 16, wherein the structural part comprises part of a production, a storage unit, a heat exchanger, a pipe, a pump, a flow meter, a valve, a desalter, a furnace, a coker, a distillation column, a fractionation column, an atmospheric column, a pipe still, a debutanizer, a reactor, a fluid catalytic cracking unit, a fluid catalytic cracking slurry settler, a hydrocracking unit, a steam cracking unit, a thermal cracking unit, a visbreaker, a reflex unit, a condenser, a scrubber, or a combination thereof; preferably, the structural part comprises part of a heat exchangers, a crude processing unit, a fluid catalytic cracking unit, a visbreaker, or a combination thereof.

20. The method of claim 19, wherein the effective amount of the anti-fouling composition is from about 1 ppm to about 500 ppm.

* * * * *